(12) United States Patent
Ohta et al.

(10) Patent No.: US 6,857,286 B2
(45) Date of Patent: Feb. 22, 2005

(54) VAPOR-COMPRESSION REFRIGERANT CYCLE SYSTEM

(75) Inventors: Hiromi Ohta, Okazaki (JP); Motohiro Yamaguchi, Hoi-gun (JP); Keiichi Kitamura, Handa (JP)

(73) Assignee: DENSO Corporation, Kariya (JP)

( * ) Notice: Subject to any disclaimer, the term of this patent is extended or adjusted under 35 U.S.C. 154(b) by 0 days.

(21) Appl. No.: 10/735,686

(22) Filed: Dec. 15, 2003

(65) Prior Publication Data

US 2004/0123624 A1 Jul. 1, 2004

(30) Foreign Application Priority Data

Dec. 17, 2002 (JP) .................................... 2002-365319

(51) Int. Cl.[7] .............................................. F25B 1/00
(52) U.S. Cl. ......................................... 62/498; 62/500
(58) Field of Search .......................... 62/498, 500, 501

(56) References Cited

U.S. PATENT DOCUMENTS 6,092,379 A    7/2000 Nishida et al.

FOREIGN PATENT DOCUMENTS

| JP | 58-33075 | 2/1983 | | |
|---|---|---|---|---|
| JP | 403005674 A | * | 1/1991 | .................. 62/498 |
| JP | 403291465 A | * | 12/1991 | .................. 62/199 |
| JP | 5-312421 | | 11/1993 | |
| JP | 9-318169 | | 12/1997 | |
| JP | 2002-81772 | | 3/2002 | |

* cited by examiner

*Primary Examiner*—Melvin Jones
(74) *Attorney, Agent, or Firm*—Harness, Dickey & Pierce, PLC

(57) ABSTRACT

A vapor-compression refrigerant cycle system includes a first evaporator in which refrigerant is evaporated, a second evaporator in which refrigerant is evaporated at a pressure lower than that in the first evaporator, and a switching device for switching between a first circulation where the refrigerant is circulated to the first evaporator and a second circulation where the refrigerant is circulated to the second evaporator. When the switching device switches to the second circulation from the first circulation, a refrigerant circulation into the second evaporator is stopped until the refrigerant pressure in the second evaporator becomes equal to or lower than a predetermined pressure. Therefore, the pressure in the second evaporator can be rapidly reduced. Further, when carbon dioxide is used as the refrigerant, the pressure in the second evaporator can be further rapidly reduced.

16 Claims, 3 Drawing Sheets

VAPOR-COMPRESSION REFRIGERANT CYCLE SYSTEM

CROSS REFERENCE TO RELATED APPLICATION

This application is based on Japanese Patent Application No. 2002-365319 filed on Dec. 17, 2002, the disclosure of which is incorporated herein by reference.

FIELD OF THE INVENTION

The present invention relates to a vapor-compression refrigerant cycle system having two evaporators with different evaporation pressures. In the vapor-compression refrigerant cycle system, refrigerant is evaporated at a temperature equal to or higher than a freezing point (e.g., 0° C.) in one evaporator, and is evaporated at a temperature lower than the freezing point in another evaporator, for example.

BACKGROUND OF THE INVENTION

A conventional vapor-compression refrigerator having two evaporators with different evaporation temperatures is described in JP-A-58-33075, for example. This vapor-compression refrigerator includes a first decompression unit for decompressing refrigerant flowing into a first evaporator in which the refrigerant is evaporated at a temperature equal to or higher than a freezing temperature, a second decompression unit for decompressing refrigerant flowing into a second evaporator in which the refrigerant is evaporated at a temperature lower than the freezing temperature, and a switching means for switching a refrigerant circulation. The switching means switches between a first circulation where refrigerant is circulated to the first evaporator and a second circulation where refrigerant is circulated to the second evaporator.

However, in the vapor-compression refrigerator described in JP-A-58-33075, refrigerant such as R134a is used, and an evaporation pressure is about 0.2 Mpa at 0° C. In this state, an average refrigerant density is about 10 Kg/M$^3$ that is extremely small as compared with carbon dioxide. Accordingly, even when a compressor operates to suck refrigerant in a low pressure member downstream of the first evaporator, such as an accumulator and a low-pressure pipe between the accumulator and the compressor, because the refrigerant density is low, a refrigerant amount (mass flow amount) sucked by the compressor is small. Therefore, it is difficult to shorten a necessary time for which a pressure in the low pressure member downstream of the first evaporator is reduced to the pressure in the second evaporator.

Thus, when the switching means switches from the first circulation to the second circulation in the vapor-compression refrigerator, a long time is necessary for reducing refrigerant pressure in the second circulation, and cooling capacity of the first evaporator or the second evaporator cannot be effectively improved.

Further, when the second evaporator is evaporated in a low temperature area lower than the freezing temperature, the refrigerant density decreases, and the refrigerant amount sucked into the compressor decreases. Therefore, it is difficult to reduce the temperature of the second evaporator to −5° C. that is actually used.

SUMMARY OF THE INVENTION

In view of the above-described problems, it is an object of the present invention to effectively improve cooling capacity in a vapor-compression refrigerant cycle system that operates while switching between a first circulation where refrigerant is circulated to a first evaporator and a second circulation where the refrigerant is circulated to a second evaporator at a pressure lower than that in the first evaporator.

According to the present invention, a vapor-compression refrigerant cycle system includes a compressor for sucking and compressing refrigerant, a radiator that cools high-pressure refrigerant discharged from the compressor, a first evaporator in which refrigerant after being decompressed is evaporated, a second evaporator in which refrigerant is evaporated at a pressure lower than that in the first evaporator, and a switching device for switching between a first circulation where the refrigerant after being decompressed is circulated to the first evaporator and a second circulation where the refrigerant is circulated to the second evaporator. In the vapor-compression refrigerant cycle system, when the switching device switches to the second circulation from the first circulation, a refrigerant circulation into the second evaporator is stopped until the refrigerant pressure in the second evaporator becomes equal to or lower than a predetermined pressure. Accordingly, the refrigerant pressure in the second evaporator can be rapidly reduced when the second circulation is set from the first circulation. As a result, a time for which refrigerant is accurately circulated into the first and second evaporators can be made longer, and cooling capacity can be effectively improved.

Preferably, carbon dioxide is used as the refrigerant. When the carbon dioxide is used as the refrigerant, an evaporation pressure in the second evaporator at −10° C. is about 2.6 Mpa. At this state, an average refrigerant density in the second evaporator is 71 Kg/m$^3$ that is greatly large as compared with a case where R134a is used as the refrigerant. Accordingly, the pressure in the second evaporator can be further rapidly reduced.

The refrigerant to be introduced from the radiator to the first evaporator in the first circulation can be decompressed by a first decompression unit, and the refrigerant to be introduced from the radiator to the second evaporator in the second circulation can be decompressed by a second decompression unit. In this case, when the switching device switches to the second circulation from the first circulation, the second decompression unit is fully closed to stop the refrigerant circulation into the second evaporator until the refrigerant pressure in the second evaporator becomes equal to or lower than the predetermined pressure. After the refrigerant pressure in the second evaporator becomes equal to or lower than the predetermined pressure after the switching device switches to the second circulation from the first circulation, the second decompression device is opened to have a predetermined throttle degree.

Alternatively, an ejector pump including a nozzle for decompressing the refrigerant from the radiator can be provided in the vapor-compression refrigerant cycle system, to circulate the refrigerant into at least one of the first evaporator and the second evaporator by an entrainment function of a high-speed refrigerant flow jetted from the nozzle. In this case, for example, the first evaporator and the second evaporator can be connected to the ejector pump in parallel, in a refrigerant flow sucked into the ejector pump.

When the ejector pump is disposed to circulate refrigerant into the first evaporator, a decompression unit can be disposed in a refrigerant passage through which refrigerant from the radiator is introduced into the second evaporator while bypassing the ejector pump, for decompressing refrigerant flowing into the second evaporator. Alternatively, an another ejector pump having a nozzle for decompressing refrigerant flowing out of the radiator is disposed to circulate refrigerant into the second evaporator by an entrainment function of a high-speed refrigerant flow jetted from the nozzle of the another ejector pump.

BRIEF DESCRIPTION OF THE DRAWINGS

Other objects, features and advantages of the present invention will become more apparent from the following detailed description made with reference to the accompanying drawings, in which.

DETAILED DESCRIPTION OF THE PREFERRED EMBODIMENTS

Plural preferred embodiments of the present invention will be now described with reference to the accompanying drawings.

First Embodiment

Figure 1:
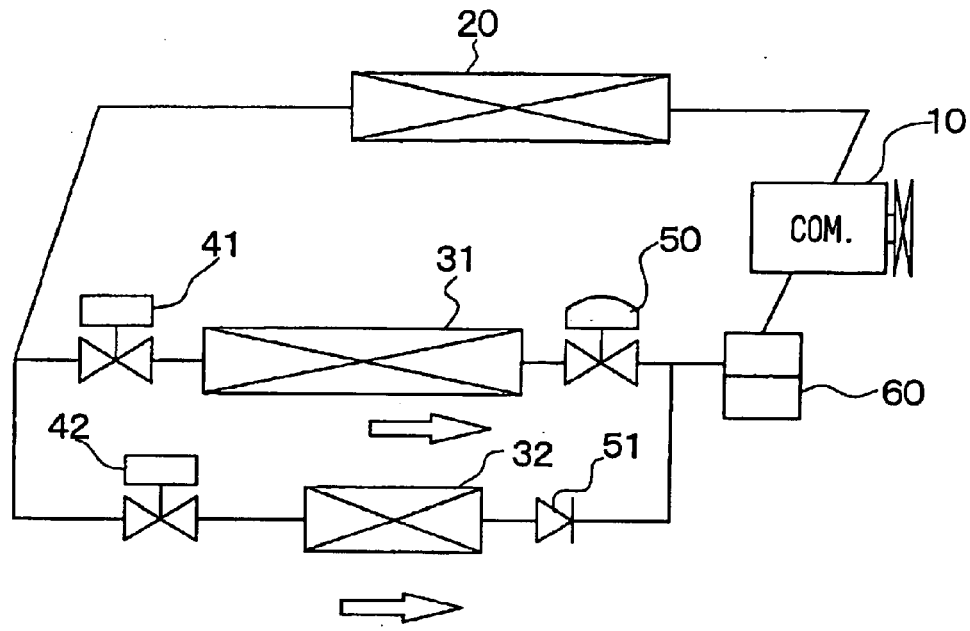
FIG. 1 is a schematic diagram showing a vapor-compression refrigerant cycle system according to a first embodiment of the present invention.

In the first embodiment, a vapor-compression refrigerant cycle system of the present invention is typically used for an air conditioner of a vehicle having a refrigerator with a cold storage and freezing function. FIG. 1 shows the refrigerant cycle system of the first embodiment.

In the refrigerant cycle system of FIG. 1, a compressor 10 sucks and compresses refrigerant by power from a vehicle engine through an electromagnetic clutch, and a radiator 20 is a high-pressure side heat exchanger for cooling the refrigerant discharged from the compressor 10 by performing heat exchange with outside air.

In the first embodiment, carbon dioxide is used as refrigerant, for example. In this case, when the temperature of the outside air is higher than the critical temperature of the refrigerant, a high-pressure side refrigerant pressure, that is, a refrigerant pressure discharged from the compressor 10 is set equal to or higher than the critical pressure of the refrigerant. When the high-pressure side refrigerant pressure is higher than the critical pressure of the refrigerant, the high-pressure refrigerant in the radiator 20 reduces its enthalpy while its refrigerant temperature reduces without having a phase change in the radiator 20. That is, in this case, the radiator 20 is used as a gas cooler. On the other hand, when the high-pressure side refrigerant pressure is lower than the critical pressure, the high-pressure refrigerant in the radiator 20 reduces its enthalpy while having a phase change (condensation) in the radiator 20.

A first evaporator 31 is a first low-pressure side heat exchanger for cooling air to be blown into a passenger compartment of the vehicle. Decompressed low-pressure refrigerant is heat exchanged in the first evaporator 31 with air to be blown into the passenger compartment, so that liquid refrigerant is evaporated in the first evaporator 31 by absorbing heat from air. Therefore, air to be blown into the passenger compartment is cooled while passing through the first evaporator 31. Similarly, a second evaporator 32 is a second low-pressure side heat exchanger for cooling an inner space of a storehouse of a refrigerator mounted in the vehicle. Decompressed low-pressure refrigerant is heat exchanged in the second evaporator 32 with air to be circulated to the inner space of the storehouse of the refrigerator, so that liquid refrigerant is evaporated in the second evaporator 32 by absorbing heat from air. Therefore, the inner space of the storehouse of the refrigerator is cooled by the second evaporator 32.

Because the second evaporator 32 is for cooling the inner space of the storehouse of the refrigerator, an evaporation pressure and an evaporation temperature in the second evaporator 32 are set lower than that in the first evaporator 31. Specifically, because the first evaporator 31 is the evaporator for performing air conditioning in the passenger compartment, the evaporation temperature is set equal to or higher than a freezing point. On the other hand, because the second evaporator 32 is the evaporator for cooling the inside space of the refrigerator with a small cooling capacity, the evaporation temperature is set lower than the freezing point.

A first decompression unit 41 is disposed for decompressing refrigerant flowing from the radiator 20 in iso-enthalpy. Refrigerant decompressed in the first decompression unit 41 is supplied to the first evaporator 31. A throttle opening degree of the first decompression unit 41 is controlled so that a high-pressure side refrigerant pressure becomes a target pressure that is determined based on a high-pressure side refrigerant temperature. For example, the high-pressure side refrigerant temperature can be detected by a refrigerant temperature sensor arranged at a refrigerant outlet side of the radiator 20. Here, the target pressure is set relative to the high-pressure side refrigerant temperature, so that coefficient of performance (COP) of the vapor-compression refrigerant cycle system approximately becomes maximum. For example, in this embodiment, the first decompression unit 41 is an electrical expansion valve in which the throttle opening degree is electrically adjusted by an actuator such as a stepping motor.

A second decompression unit 42 is disposed for decompressing refrigerant flowing from the radiator 20 in iso-enthalpy. Refrigerant decompressed in the second decompression unit 42 is supplied to the second evaporator 32. A throttle opening degree of the second decompression unit 42 is controlled so that the refrigerant pressure in the second evaporator 32 becomes lower than a predetermined pressure. For example, in this embodiment, as the second decompression device 42, a mechanical type expansion valve is used. Generally, the mechanical type expansion valve mechanically senses the pressure in the second evaporator 32, and controls its throttle opening degree.

An electromagnetic valve 50 is disposed to open and close a refrigerant passage at a refrigerant outlet side of the first evaporator 31. The electromagnetic valve 50 is used as a switching unit (switching means) for switching between a first circulation where refrigerant is circulated to the first evaporator 31 and a second circulation where refrigerant is circulated to the second evaporator 32. A check valve 51 is disposed to allow a refrigerant flow from the second evaporator 32 toward a gas-liquid separator 60. Therefore, when refrigerant is circulated to the first evaporator 31, the check valve 51 prevents refrigerant from being circulated to the second evaporator 32.

Refrigerant flowing out of the evaporator 31, 32 flows into the gas-liquid separator 60. The refrigerant flowing into the gas-liquid separator 60 is separated into gas refrigerant and liquid refrigerant, and the liquid refrigerant is stored in the gas-liquid separator 60 as an excessive refrigerant. Gas refrigerant from the gas-liquid separator 60 is supplied to a suction side of the compressor 10, and is compressed in the compressor 10.

Next, operation of the vapor-compression refrigerant cycle system according to the first embodiment will be now described.

When an air conditioning mode is set, air is blown to the passenger compartment, and the air-conditioning in the passenger compartment is performed. In the air conditioning mode, the electromagnetic valve 50 is fully opened, and the compressor 10 is operated. In this case, the opening degree of the first decompression unit 41 is controlled so that the high-pressure side refrigerant pressure becomes the target pressure, and an operation rate of the compressor 10 is controlled so that the temperature of the first evaporator 31 becomes a predetermined temperature. For example, the operation rate of the compressor 10 is controlled by performing an ON/OFF rate control of the electromagnet clutch.

As the temperature of the first evaporator 31, a post-evaporator air temperature immediately after passing through the first evaporator 31 is used. However, as the temperature of the first evaporator 31, a refrigerant pressure in the first evaporator 31 or a surface temperature of the first evaporator 31 can be used. The refrigerant pressure at a low-pressure side, that is, the refrigerant pressure in the first evaporator 31 corresponds to an evaporation temperature of refrigerant in the first evaporator 31.

Further, the second decompression unit 42 is operated so that the refrigerant pressure in the second evaporator 32 becomes lower than the pressure corresponding to the evaporation temperature of the first evaporator 31. Accordingly, in the air conditioning mode, the second decompression device 42 is generally fully closed. Therefore, refrigerant only flows to the first evaporator 31, and air to be blown into the passenger compartment is cooled and dehumidified in the first evaporator 31.

When a refrigerator cooling mode is set, the storehouse of the refrigerator is cooled. In the refrigerator cooling mode is set, the electromagnetic valve 50 is fully closed, and the compressor 10 is operated. Because the electromagnetic valve 50 is closed, refrigerant circulation into the first evaporator 31 is stopped, and refrigerant is not evaporated in the first evaporator 31. After the second circulation is switched from the first circulation, the closing state of the second decompression unit 42 is maintained for a predetermined time. Because the compressor 10 operates, gas refrigerant in the gas-liquid separator 60 and in a low-pressure refrigerant pipe downstream from the electromagnetic valve 50 and the check valve 51 is sucked into the compressor 10, and the low-pressure side refrigerant pressure decreases to the pressure in the second evaporator 32.

When the low-pressure side refrigerant pressure becomes equal to or lower than a predetermined pressure, the second decompression unit 42 is opened. At this time, refrigerant stored at an upstream side of the second decompression unit 42 flows into the second decompression unit 42 at a stretch, and is greatly decompressed. The decompressed refrigerant flows into the second evaporator 32 to be evaporated, so that the inner space of the storehouse of the refrigerator is cooled.

In this embodiment, because carbon dioxide is used as the refrigerant, the evaporation pressure of the second evaporator 32 at $-10°$ C. is 2.6 Mpa. In this state, the average refrigerant density is about 71 $Kg/M^3$, and is greatly larger than that in a case where R134a is used as the refrigerant. Therefore, in this embodiment, the refrigerant amount (mass flow amount) sucked by the compressor 10 becomes larger in the refrigerant cooling mode, and the pressure in the second evaporator 32 can be rapidly decreased to a predetermined pressure. Accordingly, an operation time, for which cooling capacity can be obtained by circulating refrigerant accurately into the first evaporator 31 and the second evaporator 32, can be made longer, and cooling capacity can be effectively improved in the vapor-compression refrigerant cycle system.

Further, according to the first embodiment of the present invention, when the refrigerator cooling mode is switched from the air conditioning mode, the second decompression valve 42 is closed until the refrigerant pressure in the second evaporator 32 becomes equal to or lower than the predetermined pressure. Therefore, the refrigerant pressure in the second evaporator 32 can be rapidly reduced. Thus, cooling capacity of the second evaporator 32 can be effectively improved.

The air conditioning mode or the refrigerator cooling mode can be alternately switched per a predetermined time, by opening and closing the electromagnetic valve 50 for a predetermined time.

Second Embodiment

The second embodiment of the present invention will be now described with reference to FIG. 2. In the second embodiment, an ejector cycle system is used as the vapor-compression refrigerant cycle system, and the present invention is applied to the ejector cycle system having an ejector pump 70.

The ejector pump 70 is an ejector (refer to JIS Z 8126 No. 2.1.2.3) in which refrigerant flowing out of the radiator 20 is decompressed and expanded so as to suck evaporated gas refrigerant, and refrigerant pressure to be sucked into the compressor 10 is increased by converting expansion energy to pressure energy.

Specifically, the ejector pump 70 includes a nozzle 70a, a mixing portion 70b and a diffuser 70c. The nozzle 70a decompresses refrigerant flowing into the ejector pump 70, substantially in isentropic by converting pressure energy of the refrigerant to speed energy of the refrigerant. The mixing portion 70b sucks refrigerant at least in one of the evaporators 31, 32 from a low-pressure refrigerant suction port by an entrainment function of a high-speed stream of refrigerant jetted from the nozzle 70a. At this time, the mixing portion 70b mixes the sucked gas refrigerant from the evaporator 31 or 32 and the refrigerant jetted from the nozzle 70a. Further, the diffuser 70c increases pressure of refrigerant to be sucked into the compressor 10 by converting the speed energy of the refrigerant to pressure energy of the refrigerant, and also mixes the sucked refrigerant and the jetted refrigerant.

In the mixing portion 70b, the jetted refrigerant (driving refrigerant) and the sucked refrigerant (driven refrigerant) are mixed so that a total momentum thereof is conserved. Therefore, also in the mixing portion 70b, refrigerant pressure (stationary pressure) is increased. In the diffuser 70c, the speed energy of refrigerant (dynamic pressure) is converted to the pressure energy of refrigerant (stationary pressure) by gradually increasing a sectional passage area of the diffuser 70c. Accordingly, the refrigerant pressure is increased in both of the mixing portion 70b and the diffuser 70c. Therefore, a pressure-increasing portion is constructed of both of the mixing portion 70b and the diffuser 70c in the ejector pump 70. In the first embodiment, a Laval nozzle (refer to "Fluid Technology" published by "Tokyou University Publisher") is used as the nozzle 70a. The Laval nozzle has a throttle portion at which a nozzle refrigerant passage has the smallest passage area for increasing a speed of refrigerant jetted from the nozzle 70a equal to or higher than the sound velocity. In the first embodiment, a taper nozzle may be used as the nozzle 70a. Further, a throttle opening degree of the nozzle 70a can be adjusted by an adjustment unit such as a needle valve.

Refrigerant from an outlet of the ejector pump 70 flows into the gas-liquid separator 60.

Figure 2:
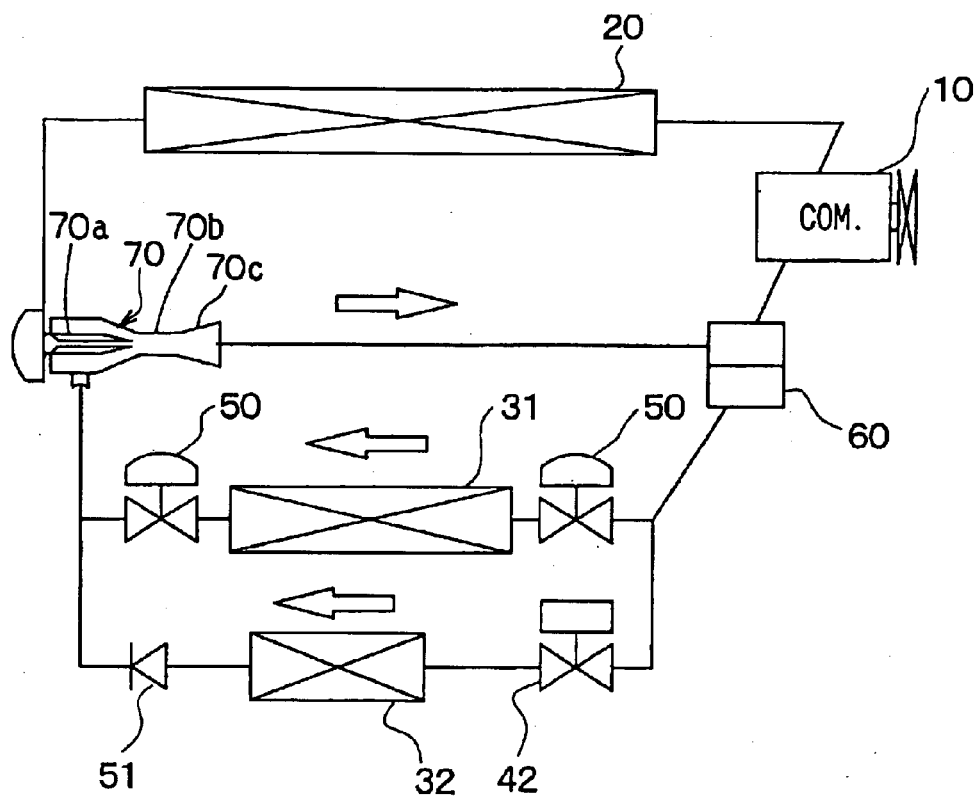
FIG. 2 is a schematic diagram showing a vapor-compression refrigerant cycle system according to a second embodiment of the present invention.

In the second embodiment, two electromagnetic valves 50 are disposed at positions upstream and downstream of the evaporator 31, and the decompression unit 42 and check valve 51 are arranged as shown in FIG. 2.

Next, operation of the refrigerant cycle system according to the second embodiment of the present invention will be now described.

When the air conditioning mode is set, both of the electromagnet valves 50 are fully opened, the decompression unit 42 is fully closed, and the compressor 10 is operated. Therefore, gas refrigerant from the gas-liquid separator 60 is sucked into the compressor 10 to be compressed in the compressor 10, and high-pressure refrigerant discharged from the compressor 10 is cooled in the radiator 20. Refrigerant from the radiator 20 is decompressed and expanded in the nozzle 70a of the ejector pump 70, and gas refrigerant evaporated in the first evaporator 31 is sucked into the pressure increasing portion 70b, 70c of the ejector pump 70. The gas refrigerant sucked from the first evaporator 31 and gas refrigerant jetted from the nozzle 70a are mixed in the mixing portion 70b, and the mixed refrigerant pressure is increased in the diffuser 70c of the ejector pump 70. Then, refrigerant from the diffuser 70c of the ejector pump 70 is returned to the gas-liquid separator 60.

In the air conditioning mode, because the decompression unit 42 is closed, refrigerant does not circulate to the second evaporator 32. Because refrigerant in the first evaporator 31 is sucked by the ejector pump 70, liquid refrigerant in the gas-liquid separator 60 is supplied to the first evaporator 31, and is evaporated in the first evaporator 31 by absorbing heat from air to be blown into the passenger compartment. Accordingly, air to be blown into the passenger compartment is cooled and dehumidified by the first evaporator 31.

When the refrigerator cooling mode is set, both of the electromagnetic valves 50 are fully closed, the closing state of the decompression unit 42 is maintained for a predetermined time, and the compressor 10 is operated. Because both of the electromagnetic valves 50 are fully closed, refrigerant does not flows into the first evaporator 31. Because the compressor 10 is operated and the decompression unit 42 is closed, refrigerant downstream from the check valve 51 is sucked into the ejector 70.

When the low-pressure side refrigerant pressure downstream from the second evaporator 32 becomes equal to lower than a predetermined pressure after the refrigerator cooling mode is set, the check valve 51 is opened and the second decompression unit 42 is opened by a predetermined throttle open degree. At this time, a large of liquid refrigerant stored in the gas-liquid separator 60 flows into the decompression unit 42 to be greatly decompressed, and thereafter flows into the second evaporator 32.

According to the second embodiment of the present invention, even in a case where the operation mode is switched from the air conditioning mode to the refrigerator cooling mode, refrigerant circulates at least in a circulation in this order of the compressor 10→the radiator 20 the nozzle 70a →the mixing portion 70b→the diffuser 70c→the gas-liquid separator 60→the compressor 10. Therefore, it can prevent the refrigerant flowing amount from being greatly changed in the vapor-compression refrigerant cycle system in the switching time from the air conditioning mode to the refrigerator cooling mode. Thus, it can prevent noises from being generated due to a pipe variation or collision that is caused in accordance with a rapid change of the refrigerant flow amount.

Third Embodiment

Figure 3:
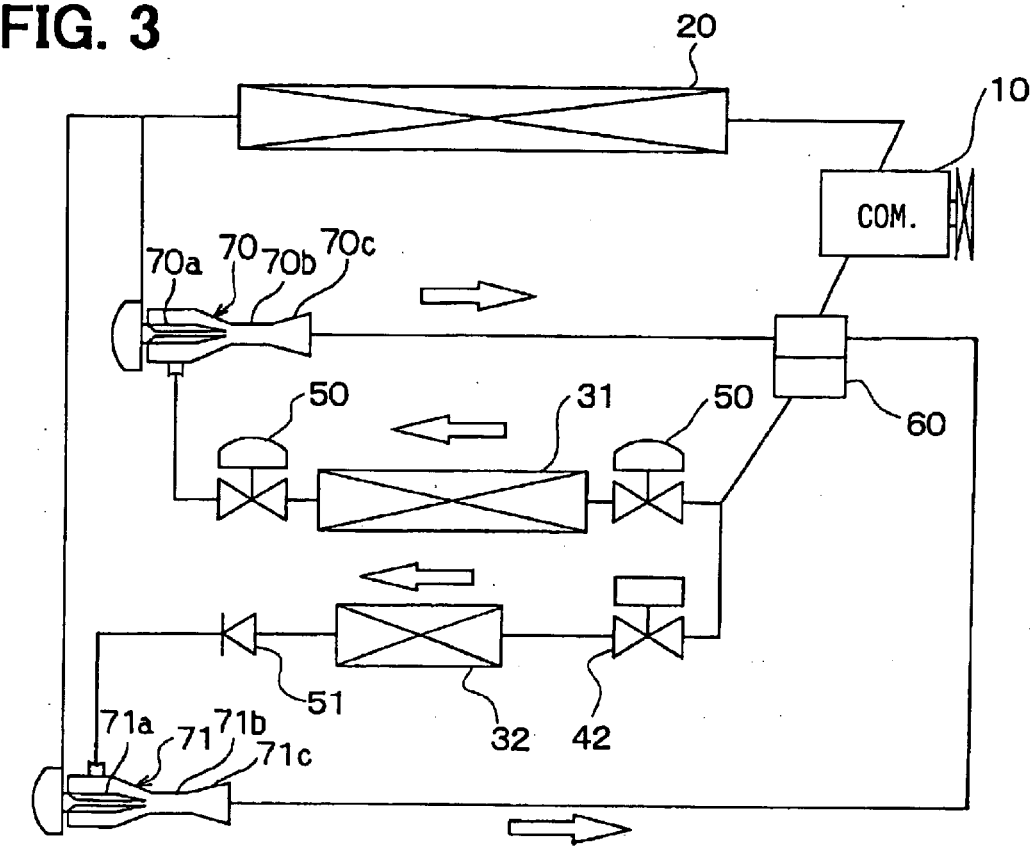
FIG. 3 is a schematic diagram showing a vapor-compression refrigerant cycle system according to a third embodiment of the present invention.

The third embodiment of the present invention will be now described with reference to FIG. 3.

In the above-described second embodiment, the first evaporator 31 and the second evaporator 32 are connected in parallel in a refrigerant flow sucked into the ejector pump 70, so that refrigerant is circulated to the first evaporator 31 or the second evaporator 32 by using the pumping function of the single ejector pump 70. However, in the third embodiment, as shown in FIG. 3, a first ejector pump 70 for circulating refrigerant to the first evaporator 31 and a second ejector 71 for circulating refrigerant to the second evaporator 32 are provided.

The first ejector pump 70 has the same structure as that of the ejector pump 70 described in the second embodiment, and the second ejector pump 71 has a structure similar to that of the ejector pump 70 described in the second embodiment. Specifically, the second ejector pump 71 includes a nozzle 71a, a mixing portion 71b and a diffuser 71c.

Accordingly, in the third embodiment, when the air conditioning mode is set, the first ejector pump 70 is operated to circulate refrigerant into the first evaporator 31. On the other hand, when the refrigerator cooling mode is set, the second ejector pump 71 is operated to circulate refrigerant into the second evaporator 32. The operation of the first ejector pump 70 and the second ejector pump 71 can be adjusted by actuators provided in the ejector pumps 70, 71. In the third embodiment, the operation of the first or second ejector pump 70, 71 is similar to that of the ejector pump 70 described in the second embodiment.

Fourth Embodiment

Figure 4:
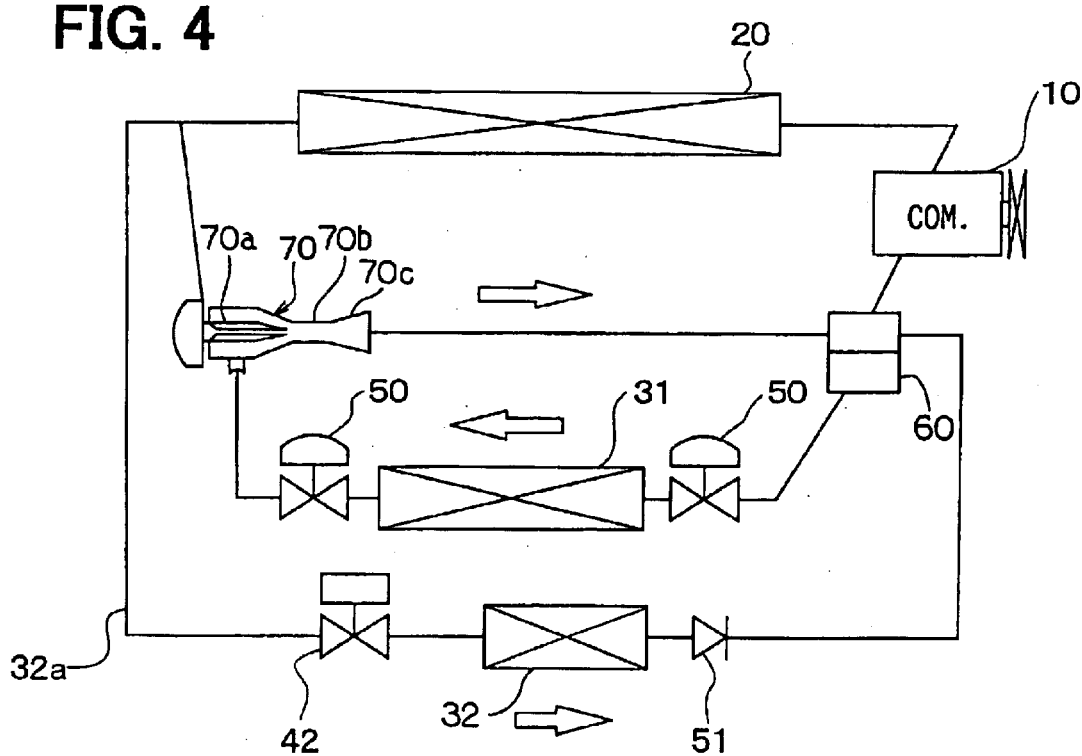
FIG. 4 is a schematic diagram showing a vapor-compression refrigerant cycle system according to a fourth embodiment of the present invention.

The fourth embodiment of the present invention will be now described with reference to FIG. 4. The fourth embodiment is a combination between the above-described first embodiment and the above-described second embodiment. In the fourth embodiment, as shown in FIG. 4, a refrigerant passage 32a through which refrigerant discharged from the radiator 20 is introduced into the second evaporator 32 while bypassing the ejector pump 70 is provided, and the second decompression unit 42 is provided in the refrigerant passage 32a. Accordingly, in the air conditioning mode, refrigerant is circulated into the first evaporator 31 similarly to that of the above-described second embodiment, so that the cooling capacity of the first evaporator 31 can be obtained. On the other hand, in the refrigerator cooling mode, refrigerant is circulated into the second evaporator 32 similarly to that of the above-described first embodiment, so that the cooling capacity of the second evaporator 32 can be obtained.

In the fourth embodiment, the vapor-compression refrigerant cycle system is operated as the ejector cycle system in the air conditioning mode, and is operated as the expansion valve system in the refrigerator cooling mode. In the expansion valve system, high-pressure pressure refrigerant from the radiator 20 is decompressed in the second decompression unit 42 (i.e., expansion valve) in iso-enthalpy. Accordingly, in the fourth embodiment, advantages described in the first and second embodiment can be obtained.

Fifth Embodiment

Figure 5:
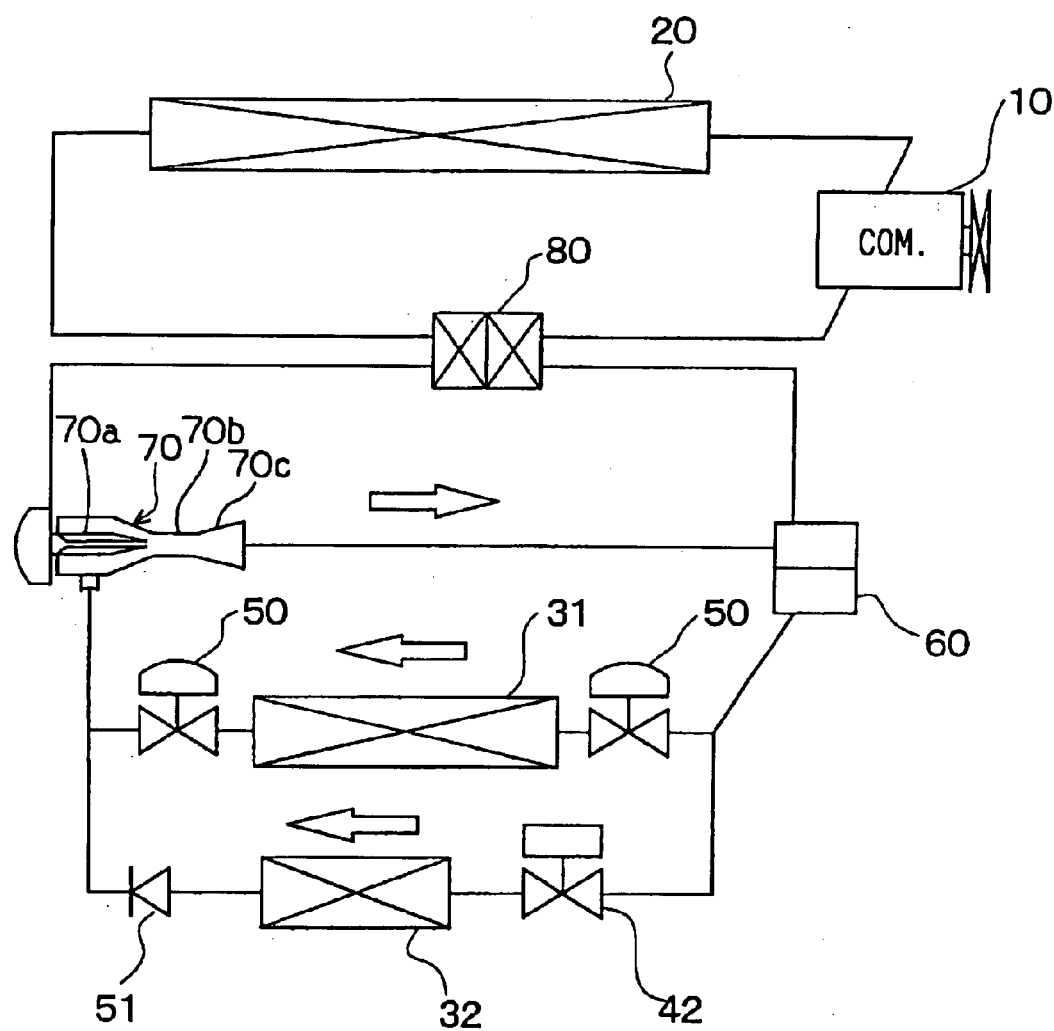
FIG. 5 is a schematic diagram showing a vapor-compression refrigerant cycle system according to a fifth embodiment of the present invention.

The fifth embodiment of the present invention will be now described with reference to FIG. 5. In the fifth embodiment, as shown in FIG. 5, an inner heat exchanger 80 is provided in the vapor-compression refrigerant cycle system. In the inner heat exchanger 80, refrigerant flowing out of the radiator 20 and refrigerant to be sucked into the compressor 10 from the gas-liquid separator 60 are heat-exchanged.

FIG. 5 shows an example where the inner heat exchanger 80 is provided for the vapor-compression refrigerant cycle system described in the second embodiment. However, the inner heat exchanger 80 can be provided for the vapor-compression refrigerant cycle system described in any one of the first, third and fourth embodiments.

Although the present invention has been fully described in connection with the preferred embodiments thereof with reference to the accompanying drawings, it is to be noted that various changes and modifications will become apparent to those skilled in the art.

For example, in the above-described embodiments of the present invention, the operation rate of the compressor 10, that is, the refrigerant flow amount discharged from the compressor 10 is controlled by the electromagnetic clutch. However, in the present invention, a variable displacement compressor can be used as the compressor 10, and the compressor operation rate or the compressor refrigerant flow amount can be controlled by controlling a displacement of the variable displacement compressor. Alternatively, the compressor 10 can be driven by using an electrical motor. In this case, the compressor operation rate or the compressor refrigerant flow amount can be controlled by controlling the rotation speed of the compressor (motor).

In the vapor-compression refrigerant cycle system of the above-described first embodiment, a bypass passage through which refrigerant from a refrigerant outlet of the second evaporator 32 flows into a refrigerant suction side of the compressor 10 while bypassing the gas-liquid separator 60 can be provided. In this case, an electromagnetic valve for opening and closing the bypass passage is provided. The electromagnetic valve opens the bypass passage until the second decompression unit 42 is opened after the electromagnetic valve 50 is closed, and closes the bypass passage after the second decompression unit 42 is opened. In this case, it can prevent refrigerant in the gas-liquid separator 60 from being sucked into the compressor 10 after the operation mode is switched from the air conditioning mode to the refrigerator cooling mode. Accordingly, after the refrigerator cooling mode is switched from the air conditioning mode, a time for decreasing the refrigerant pressure at the low-pressure side can be made shorter. Specifically, a time period from the state where the electromagnetic valve 50 is closed to the state where the second decompression unit 42 is opened can be reduced.

In the above-described embodiments, the vapor-compression refrigerant cycle system of the present invention is typically used for the vehicle with the air conditioner and the refrigerator. However, the vapor-compression refrigerant cycle system can be used for a room with an air conditioner and a refrigerator.

Such changes and modifications are to be understood as being within the scope of the present invention as defined by the appended claims.

What is claimed is:

1. A vapor-compression refrigerant cycle system comprising:

a compressor for sucking and compressing refrigerant;

a radiator that cools high-pressure refrigerant discharged from the compressor;

a first evaporator in which refrigerant after being decompressed is evaporated;

a second evaporator in which refrigerant is evaporated at a pressure lower than that in the first evaporator;

a switching device for switching between a first circulation where the refrigerant after being decompressed is circulated to the first evaporator and a second circulation where the refrigerant is circulated to the second evaporator; wherein:

a refrigerant passage portion through which the high-pressure refrigerant from the radiator flows toward the compressor while bypassing the second evaporator when the switching device switches between the first circulation and the second circulation;

when the switching device switches to the second circulation from the first circulation, refrigerant circulation into the second evaporator is stopped until the refrigerant pressure in the second evaporator becomes equal to or lower than a predetermined pressure.

2. The vapor-compression refrigerant cycle system according to claim 1, wherein carbon dioxide is used as the refrigerant.

3. A vapor-compression refrigerant cycle system comprising:

a compressor for sucking and compressing refrigerant;

a radiator that cools high-pressure refrigerant discharged from the compressor;

a first evaporator in which refrigerant after being decompressed is evaporated;

a second evaporator in which refrigerant is evaporated at a pressure lower than that in the first evaporator;

a switching device for switching between a first circulation where the refrigerant after being decompressed is circulated to the first evaporator and a second circulation where the refrigerant is circulated to the second evaporator;

a first decompression unit for decompressing refrigerant to be introduced from the radiator to the first evaporator in the first circulation; and a second decompression unit for decompressing refrigerant to be introduced from the radiator to the second evaporator in the second circulation, wherein:

when the switching device switches to the second circulation from the first circulation, refrigerant circulation into the second evaporator is stopped until the refrigerant pressure in the second evaporator becomes equal to or lower than a predetermined pressure;

when the switching device switches to the second circulation from the first circulation, the second decompression unit is fully closed to stop the refrigerant circulation into the second evaporator until the refrigerant pressure in the second evaporator becomes equal to or lower than the predetermined pressure; and when the refrigerant pressure in the second evaporator becomes equal to or lower than the predetermined pressure after the switching device switches to the second circulation from the first circulation, the second decompression device is opened to have a predetermined throttle degree.

4. A vapor-compression refrigerant cycle system comprising:
   a compressor for sucking and compressing refrigerant;
   a radiator that cools high-pressure refrigerant discharged from the compressor;
   a first evaporator in which refrigerant after being decompressed is evaporated;
   a second evaporator in which refrigerant is evaporated at a pressure lower than that in the first evaporator;
   a switching device for switching between a first circulation where the refrigerant after being decompressed is circulated to the first evaporator and a second circulation where the refrigerant is circulated to the second evaporator; and
   an ejector pump that includes a nozzle for decompressing the refrigerant from the radiator; wherein
   when the switching device switches to the second circulation from the first circulation, refrigerant circulation into the second evaporator is stopped until the refrigerant pressure in the second evaporator becomes equal to or lower than a predetermined pressure;
   the ejector pump is disposed to circulate refrigerant into at least one of the first evaporator and the second evaporator by an entrainment function of a high-speed refrigerant flow jetted from the nozzle.

5. The vapor-compression refrigerant cycle system according to claim 4, wherein the first evaporator and the second evaporator are connected to the ejector pump in parallel, in a refrigerant flow sucked into the ejector pump.

6. The vapor-compression refrigerant cycle system according to claim 4, wherein the ejector pump is disposed to circulate refrigerant into the first evaporator, the system further comprising
   a decompression unit, disposed in a refrigerant passage through which refrigerant from the radiator is introduced into the second evaporator while bypassing the ejector pump, for decompressing refrigerant flowing into the second evaporator.

7. The vapor-compression refrigerant cycle system according to claim 4, wherein the ejector pump is disposed to circulate refrigerant into the first evaporator, the system further comprising
   an another ejector pump having a nozzle for decompressing refrigerant flowing out of the radiator,
   the another ejector pump is disposed to circulate refrigerant into the second evaporator by an entrainment function of a high-speed refrigerant flow jetted from the nozzle of the another ejector pump.

8. The vapor-compression refrigerant cycle system according to claim 4, further comprising
   a gas-liquid separator for separating refrigerant discharged from the ejector pump into gas refrigerant and liquid refrigerant, the gas-liquid separator including a gas refrigerant outlet coupled to a refrigerant suction side of the compressor and a liquid refrigerant outlet coupled to at least one of a refrigerant inlet of the first evaporator and a refrigerant inlet of the second evaporator.

9. The vapor-compression refrigerant cycle system according to claim 1, further comprising
   an inner heat exchanger disposed to perform a heat exchange between refrigerant flowing out of the radiator and refrigerant to be sucked into the compressor.

10. A vapor-compression refrigerant cycle system comprising
    a compressor for sucking and compressing refrigerant;
    a radiator that cools high-pressure refrigerant discharged from the compressor;
    a first evaporator in which refrigerant after being decompressed is evaporated;
    a second evaporator in which refrigerant is evaporated at a pressure lower than that in the first evaporator;
    a switching device for switching between a first circulation where the refrigerant after being decompressed is circulated to the first evaporator and a second circulation where the refrigerant is circulated to the second evaporator; and
    an ejector pump that includes a nozzle for decompressing the refrigerant from the radiator,
    wherein the ejector pump is disposed to circulate refrigerant into at least one of the first evaporator and the second evaporator by an entrainment function of a high-speed refrigerant flow jetted from the nozzle.

11. The vapor-compression refrigerant cycle system according to claim 10, wherein carbon dioxide is used as the refrigerant.

12. The vapor-compression refrigerant cycle system according to claim 10, wherein the first evaporator and the second evaporator are connected to the ejector pump in parallel, in a refrigerant flow sucked into the ejector pump.

13. The vapor-compression refrigerant cycle system according to claim 10, wherein the ejector pump is disposed to circulate refrigerant into the first evaporator, the system further comprising
    a decompression unit, disposed in a refrigerant passage through which refrigerant from the radiator is introduced into the second evaporator while bypassing the ejector pump, for decompressing refrigerant flowing into the second evaporator.

14. The vapor-compression refrigerant cycle system according to claim 10, wherein the ejector pump is disposed to circulate refrigerant into the first evaporator, the system further comprising
    an another ejector pump having a nozzle for decompressing refrigerant flowing out of the radiator,
    the another ejector pump is disposed to circulate refrigerant into the second evaporator by an entrainment function of a high-speed refrigerant flow jetted from the nozzle of the another ejector pump.

15. The vapor-compression refrigerant cycle system according to claim 10, further comprising
    a gas-liquid separator for separating refrigerant discharged from the ejector pump into gas refrigerant and liquid refrigerant, the gas-liquid separator including a gas refrigerant outlet coupled to a refrigerant suction side of the compressor and a liquid refrigerant outlet coupled to at least one of a refrigerant inlet of the first evaporator and a refrigerant inlet of the second evaporator.

16. The vapor-compression refrigerant cycle system according to claim 10, further comprising
    an inner heat exchanger disposed to perform a heat exchange between refrigerant flowing out of the radiator and refrigerant to be sucked into the compressor.

* * * * *